(12) United States Patent
Hur et al.

(10) Patent No.: US 7,048,418 B2
(45) Date of Patent: May 23, 2006

(54) STRUCTURE FOR HOLDING LAMP WIRE IN LIQUID CRYSTAL DISPLAY DEVICE

(75) Inventors: Dong Im Hur, Kumi-shi (KR); Eun Seok Jang, Pusan-kwangyokshi (KR); Sam Young An, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 3 days.

(21) Appl. No.: 10/325,020

(22) Filed: Dec. 23, 2002

(65) Prior Publication Data

US 2003/0117807 A1  Jun. 26, 2003

(30) Foreign Application Priority Data

Dec. 26, 2001  (KR) ................. 2001-85289

(51) Int. Cl.
F21S 13/00 (2006.01)
G02F 1/1333 (2006.01)
H02G 3/18 (2006.01)

(52) U.S. Cl. .................... 362/457; 362/634; 349/58; 174/64; 174/65 R

(58) Field of Classification Search ............. 174/64, 174/65; 439/445–447, 449, 456, 942; 349/58–67; 362/31, 561, 457, 23, 26, 29, 217, 221, 630, 362/632, 633, 634
See application file for complete search history.

(56) References Cited

U.S. PATENT DOCUMENTS

| | | | |
|---|---|---|---|
| 4,719,314 A * | 1/1988 | Nothnagel et al. | 439/446 |
| 4,809,078 A * | 2/1989 | Yabe et al. | 349/58 |
| 5,375,005 A * | 12/1994 | Komano | 349/58 |
| 5,729,310 A * | 3/1998 | Horiuchi et al. | 349/62 |
| 5,999,238 A * | 12/1999 | Ihara | 348/58 |
| 6,175,396 B1 * | 1/2001 | Kim et al. | 349/58 |
| 6,229,584 B1 * | 5/2001 | Chuo et al. | 349/58 |
| 6,330,148 B1 * | 12/2001 | Won et al. | 349/58 |
| 6,686,979 B1 * | 2/2004 | Yoshino | 349/58 |
| 6,762,806 B1 * | 7/2004 | Matsuo et al. | 349/58 |
| 2004/0125605 A1 * | 7/2004 | Wang | |

FOREIGN PATENT DOCUMENTS

| | | | | |
|---|---|---|---|---|
| JP | 62255918 A | * 11/1987 | | 349/61 |
| KR | 1002238810000 | 7/1999 | | |
| KR | 10200020091351 | 12/2002 | | |

\* cited by examiner

*Primary Examiner*—Alan Cariaso
(74) *Attorney, Agent, or Firm*—McKenna Long & Aldridge LLP

(57) ABSTRACT

A structure for holding a lamp wire in a LCD module is disclosed. The structure is formed such that a lamp wire is easily attached to the LCD module and minimizes the possibility of the lamp wire from separating from the fixing recess. The structure includes a fixing recess formed at one edge of the LCD device. The fixing recess has an open external and open top surface. A fixing hook having two ends, where one end is fixed to an upper side of an inside wall of the fixing recess and the other end bent at an angled forming a slight separation from an inner surface of an external end of the fixing recess. The lamp wire is easily inserted into the fixing recess through a gap between the fixing hook and the external end of the fixing recess and held in place due to the elasticity of the fixing hook.

14 Claims, 4 Drawing Sheets

STRUCTURE FOR HOLDING LAMP WIRE IN LIQUID CRYSTAL DISPLAY DEVICE

This application claims the benefit of Korean Patent Application No. P2001-85289, filed on Dec. 26, 2001, which is hereby incorporated by reference for all purposes as if fully set forth herein.

BACKGROUND OF THE INVENTION

1. Field of the Invention

The present invention relates to a structure for holding a lamp wire in a liquid crystal display (LCD) device, and more particularly, to a structure for holding a lamp wire in a liquid crystal display device in which the lamp wire connected to a lamp for a backlight is easily fixed to the LCD module at a portion being extracted outwardly.

2. Discussion of the Related Art

A liquid crystal display (LCD) device, plasma display panel (PDP) and field emission display (FED) are all types of flat displays that provide excellent visual perception as compared to a cathode-ray tube (CRT). Additionally, the LCD consumes much less power than the CRT of the same size and produces significantly less heat. Because of these features the LCD has been drawing particular attention as a next generation display for cellular phones, computer monitors, and television (TV) receivers.

A typical LCD is formed with two thin glass substrates having surfaces that have been specially treated and a liquid crystal injected between the two glass substrates. The liquid crystal is an organic liquid whose physical properties resemble those of a crystal in the formation of loosely ordered molecular arrays similar to a regular crystalline lattice and the anisotropic refraction of light. The arrangement of the molecules of liquid crystal is changed according to a voltage difference between electrodes formed on the glass substrates. Changing the orientation of the liquid crystal molecules varies the light transmittance through the LCD panel. Accordingly, the intensity of brightness generated on a display panel can be controlled and an image can be displayed. A light source such as a lamp is required to display an image on the LCD.

The LCD module includes a backlight assembly as a light source arranged behind or along the side of the LCD panel. The backlight assembly includes a plurality of prism and diffusion sheets.

FIGS. 1 and 3 illustrate a prior art structure for holding a lamp wire in a liquid crystal display (LCD) device. Referring to FIGS. 1 and 3, a lamp (not shown) for emitting light is provided at a lower and upper side of an LCD module 1, and a lamp wire 2 for electrically connecting the lamp to an external power source is connected to the lamp. A connector 3 for connecting the lamp wire to an external device is arranged at an end of the lamp wire 2 and a lamp wire tube 4 for covering the lamp wire is arranged behind the connector 3.

When the lamp wire is extracted, the lamp wire is firstly fixed into the LCD module so as to prevent a junction between the lamp and the lamp wire from being disconnected. Referring to FIGS. 2 and 3, a fixing recess 11 is formed at an edge of the LCD module 1 and a fixing hook 12 is arranged in the fixing recess 11 and the fixing hook 12 is inwardly bent in a "¬" shape. The lamp wire 2 is inserted into the fixing recess 11 through a space between an inside end of the fixing hook 12 and an inside wall 11a of the fixing recess. Additionally, a pad 13 is arranged between the inside end of the fixing hook 12 and the inside wall 11a of the fixing recess, thereby preventing the lamp wire from dislodging.

In the aforementioned related art structure the lamp wire 2 is inserted into the fixing recess 11 through the space provided inside the fixing recess 11 in such a manner that the lamp wire 2 is bent toward the inside of the LCD module 1. Additionally, the pad 13 is arranged preventing the lamp wire 2 from becoming separated from the fixing recess. As demonstrated by the foregoing the process steps for fixing the lamp wire 2 to the LCD module 1 including forming the pad 13 are complicated and inconvenient. As a result the manufacturing cost of producing the device is increased.

SUMMARY OF THE INVENTION

Accordingly, the present invention is directed to a structure for holding a lamp wire in a liquid crystal display (LCD) device that substantially obviates one or more of the problems due to limitations and disadvantages of the related art.

An advantage of the present invention is to provide a structure for holding a lamp wire in an LCD module in which the lamp wire may be easily connected to a lamp of the backlight assembly. Additionally, the lamp wire is connected to the LCD module preventing the lamp wire from separating from the fixing recess without an additional pad as used in the prior art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention as embodied and broadly described, a structure for holding a lamp wire in an LCD device including a fixing recess is formed at one edge of the LCD device. The fixing recess has open external and open top surfaces. A fixing hook having first and second ends, the first end is arranged on upper side of an inside wall of the fixing recess, while the second end is bent at an angle so as to be minutely apart from an inner surface of an external end of the fixing recess.

In another aspect of the present invention, a structure for holding a lamp wire in an LCD device includes a fixing recess formed along an edge of the LCD device, the fixing recess having an open top surface and an open side surface. A fixing member is connected to an external upper side of the fixing recess by a fastening element, and the fixing member covers a portion of the top surface of the fixing recess and supports the lamp wire inserted into the fixing recess.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
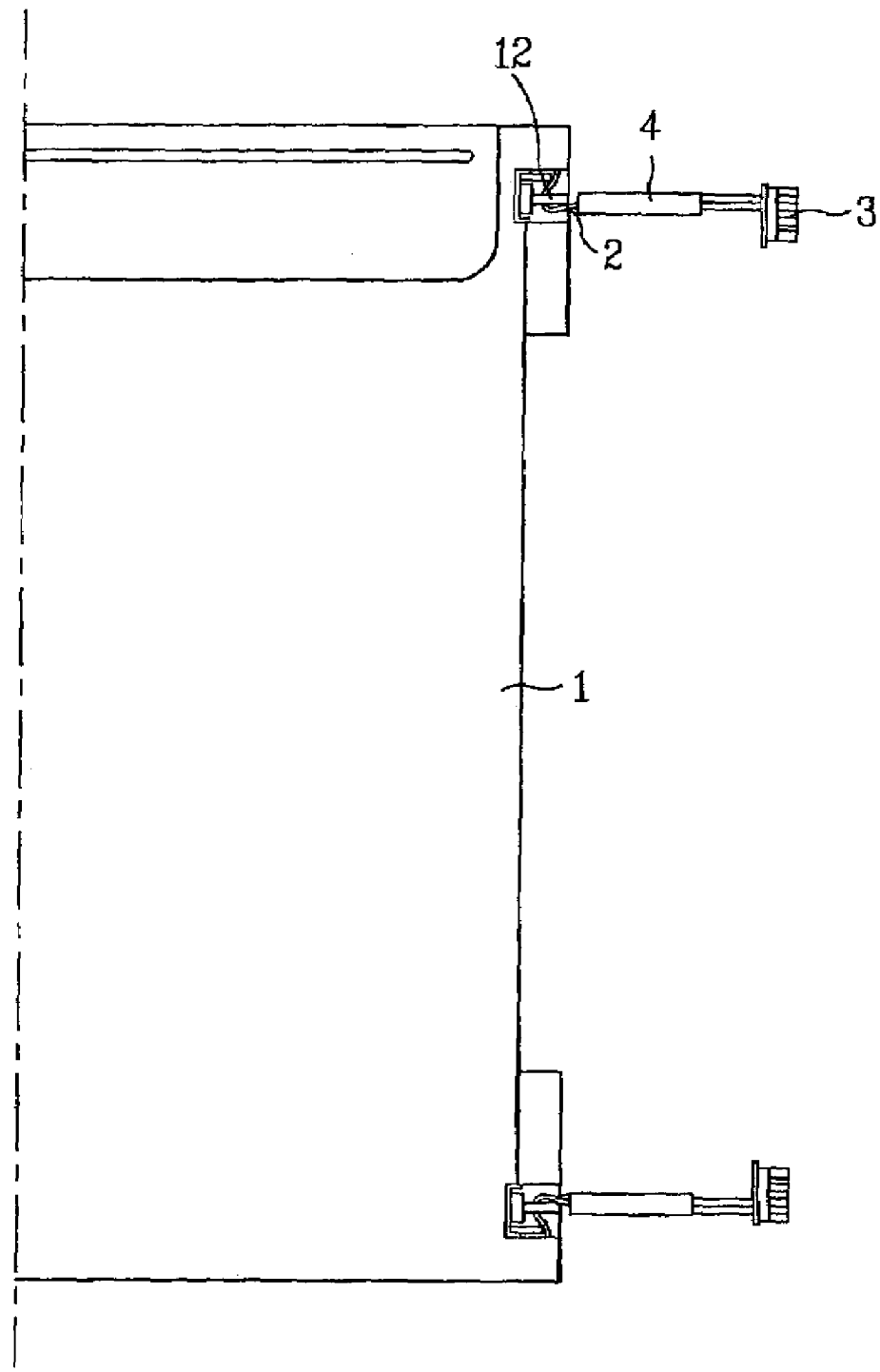
FIG. 1 illustrates a rear view of a related art structure for holding a lamp with in an LCD.
Figure 2:
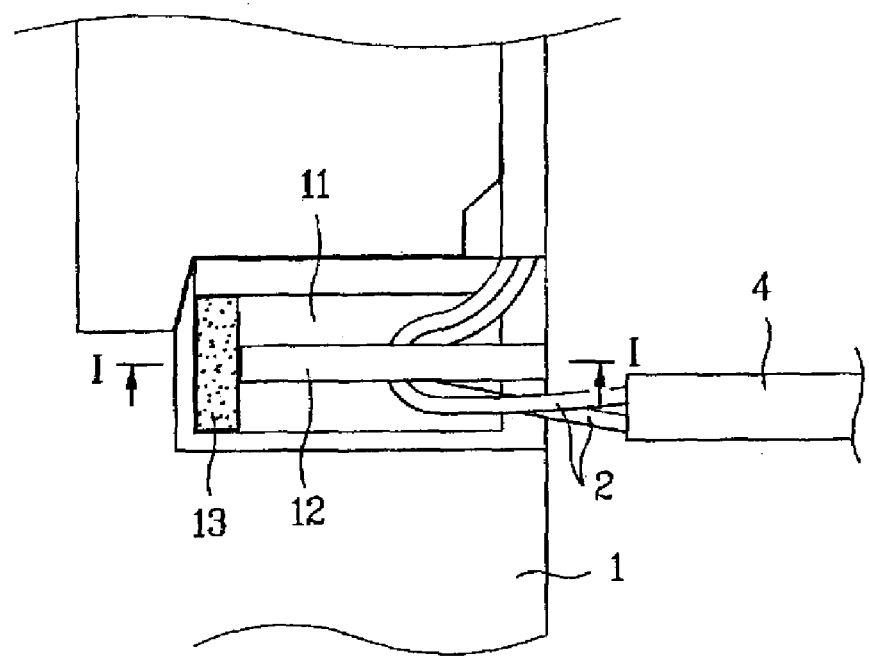
FIG. 2 illustrates a plan view of a related art structure for holding a lamp wire in an LCD device of FIG. 1.
Figure 3:
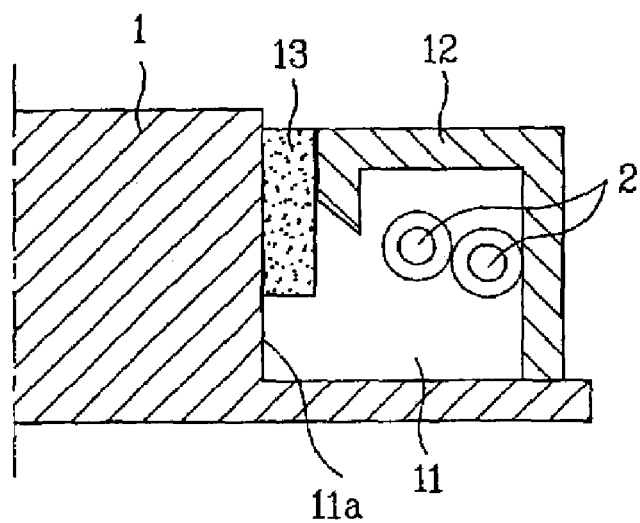
FIG. 3 illustrates a sectional view of a related art structure for holding a lamp wire in an LCD device taken along line I—I of FIG. 2.
Figure 4:
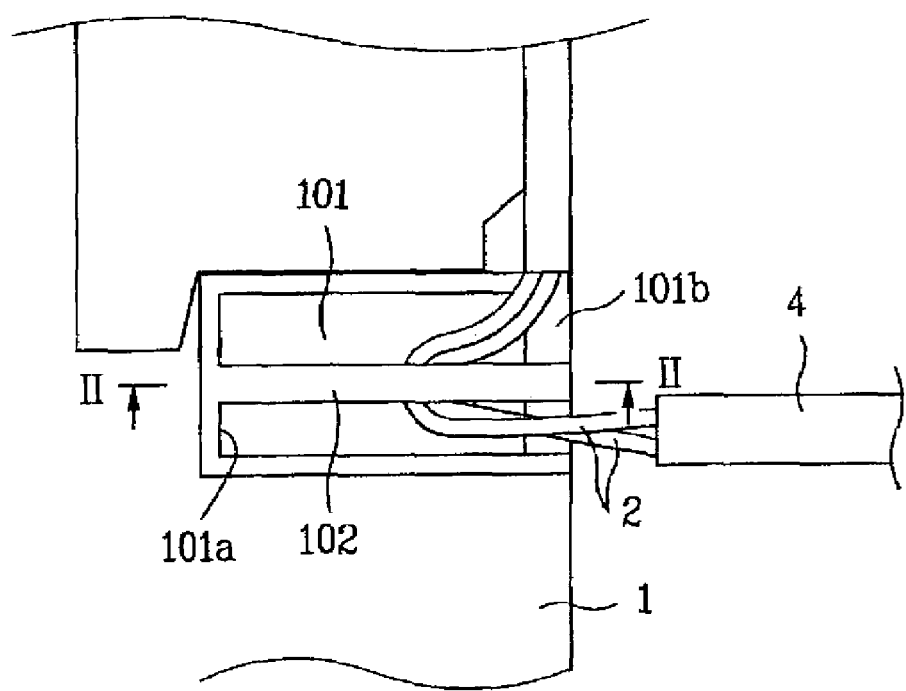
FIG. 4 illustrates a rear view of a structure for holding a lamp wire in an LCD device according to an embodiment of the present invention.
Figure 5:
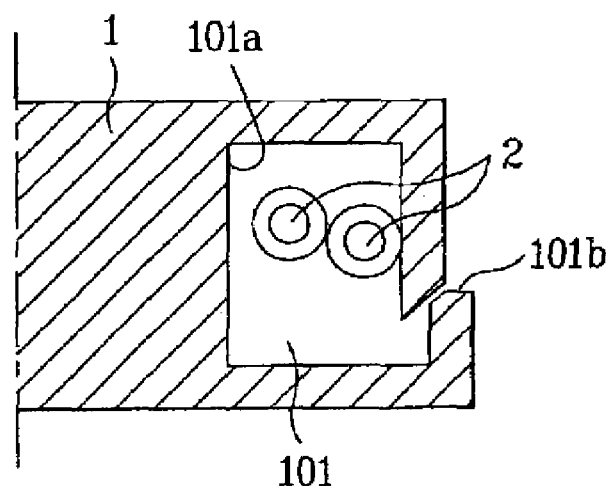
FIG. 5 illustrates a sectional view of a structure for holding a lamp wire in an LCD device taken along line II—II of FIG. 4.
Figure 6:
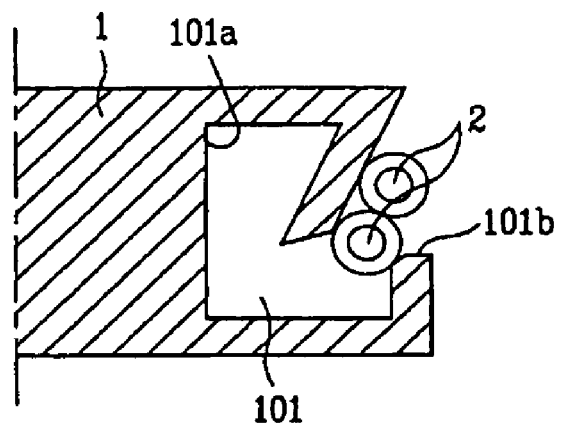
FIG. 6 illustrates a plan view of a structure and method for inserting a lamp wire into a holding structure of FIG. 4 according to an embodiment of the present invention.

FIGS. 4 and 5 are views illustrating a structure for holding a lamp wire in an LCD device according to an embodiment of the present invention.

Referring to FIGS. 4 and 5, a lamp (not shown) for emitting light is arranged at an inner side of a LCD module 1 and a lamp wire 2 for electrically connecting the lamp to an external power source is extracted to the outside of the LCD module 1 through a corner of the LCD module 1.

The LCD module 1 includes a fixing recess 101 for holding the lamp wire 2 at a location where the lamp wire 2 is extracted. The fixing recess 101 has open external and top surface (a portion toward a rear surface of the LCD device).

A fixing hook 102 is formed in substantially a "¬" shape and the hook may be made of a synthetic resin. One end of the fixing hook 102 is fixed to an upper side of an inside wall 101a and the other end of the fixing hook 102 is bent substantially downward. The substantially downward portion of the fixing hook 102 creates an exposed surface on an external end 101b of the fixing recess 101, creating a slight gap between the external end of the fixing hook 102 and the external end of the fixing recess 101.

An operator can insert a lamp wire 2 into the fixing recess 101 through the slight gap between the external end of the fixing hook 102 and the external end of the fixing recess 101. Accordingly, the lamp wire 2 is easily inserted into the fixing recess 101.

After inserting the lamp wire 2 into the fixing recess 101, the fixing hook 102 returns to its original position due to the elasticity of the fixing hook. The gap formed between the external end of the fixing hook 102 and the external end of the fixing recess 101 is smaller than a diameter of the lamp wire 2. That is, after the lamp wire 2 is inserted into the fixing recess 101 the lamp wire 2 does become separated from the fixing recess 101. Of course the lamp wire 2 may be removed from the fixing recess 101 by pushing the fixing hook 102 inwardly and removing the lamp wire 2.

In the structure for holding the lamp wire in the LCD module according to of the present invention, the fixing hook 102 is inwardly moved when the lamp wire 2 is inserted into the fixing recess 101. The fixing hook 102 is returned to its original position because of the elasticity of the fixing hook 102. Accordingly, the fixing hook 102 is made of a material having a stiffness that is suitable for holding the lamp wire in the fixing recess 101.

Figure 7:
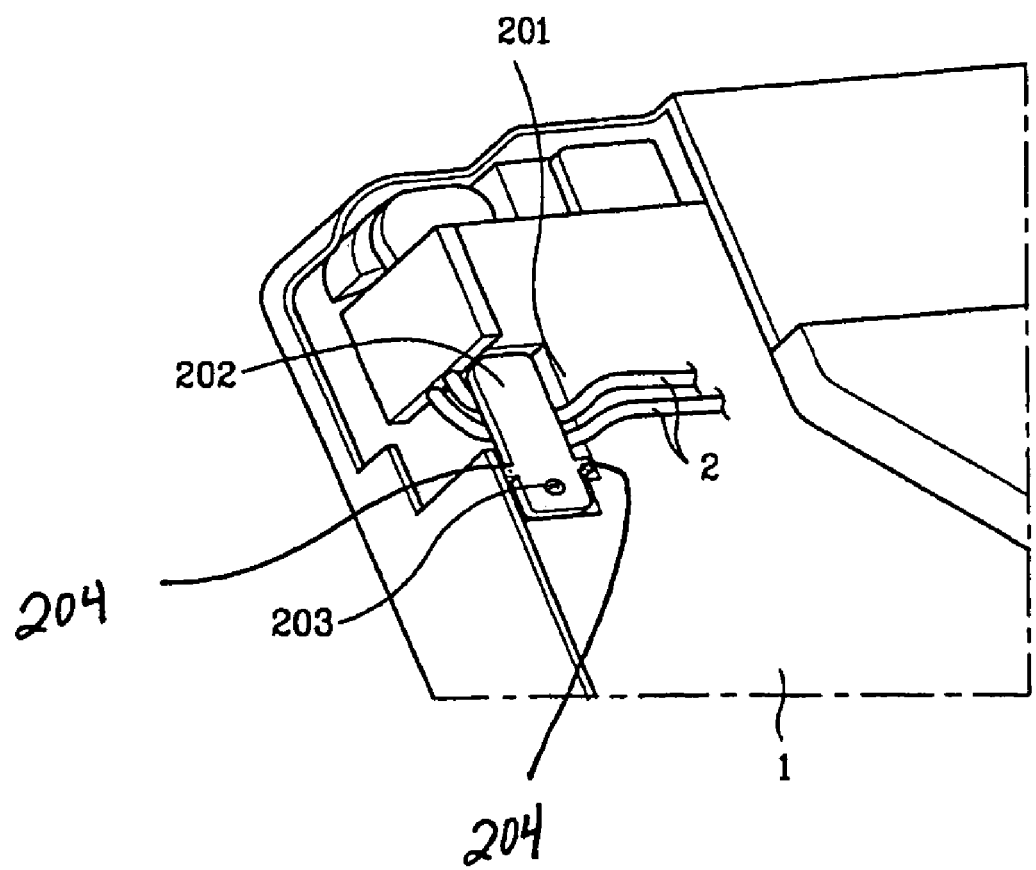
FIG. 7 illustrates a perspective view of a structure for holding a lamp wire in an LCD device according to another embodiment of the present invention.

FIG. 7 illustrates a perspective view illustrating a structure for holding a lamp wire in an LCD module according to another embodiment of the present invention.

Referring to FIG. 7, a fixing recess 201 is formed at an inner side of an LCD module. The fixing recess 201 has open external portions on top portion on a rear surface of the LCD module. A fixing member 202 is formed at a top surface of the fixing recess 201 covering the top of the fixing recess 101.

One end of the fixing member 202 is connected to an external side of the fixing recess 201 by a fixing means 203 such as a screw and the like. The other end of the fixing member 202 is arranged on an external side of the fixing recess 201 for supporting the lamp wire inserted into the fixing recess 201. The fixing member 202 is preferably made of a stiff material having negligible elasticity, so that the lamp wire 2 will not become separated from the fixing member 202. Accordingly, the fixing member 202 prevents the lamp wire 2 from becoming dislodged from the fixing recess 201.

The lamp wire 2 is positioned inside the fixing recess 201 and the fixing member 202 is provided at the top of the fixing recess 201. The one end of the fixing member 202 is connected to the external side of the fixing recess by the fixing means such as the screw 203, and the like. Accordingly, the lamp wire 2 is easily fixed to the LCD module 1.

As only one end of the fixing member 202 is fixed to the external side of the fixing recess the material of the fixing member 202 should have minor elasticity. However, if both ends of the fixing member 202 are fixed to the external sides of the fixing recess by the fixing means, the lamp wire 2 will not come out of the fixing recess regardless of the kind of the material used in forming the fixing member 202. Accordingly, the material of the fixing member can be selected from a wide range of different materials of varying elasticities. As may be seen with reference to FIG. 7, in accordance with an embodiment of the present invention, the fixing member 202 may include two notch protrusions 204 for aligning a fastening element, such as the screw 203.

As mentioned above, the structure for holding the lamp wire in the LCD device according to the present invention has the following advantages.

As the structure for holding the lamp wire in the LCD device according to the present invention, the lamp wire is not bent toward the inside of the LCD module, but is inserted directly into the fixing recess from the outside of the LCD module. Accordingly, it does not require providing an additional pad for preventing the lamp wire from becoming dislodged from the fixing recess, thus simplifying the manufacturing process, reducing the number of steps in the manufacturing process, and decreasing manufacturing price.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A structure for holding a lamp wire in a LCD device, comprising:

an LCD module including a fixing recess formed along an edge of an LCD panel, wherein the fixing recess includes a sidewall and an open portion;

a fixing hook having a first and second end, wherein the first end is fixed to the sidewall of the fixing recess and the second end extends in at an angle forming a separation from an inner surface of an external end of the fixing recess.

2. The structure for holding a lamp wire in a LCD device of claim 1, wherein the fixing hook is made of synthetic resin.

3. The structure for holding a lamp wire in a LCD device of claim 1, wherein the fixing hook is made of plastic.

4. The structure for holding a lamp wire in a LCD device of claim 1, wherein the first end of the fixing hook is attached to the fixing recess with a fastening element.

5. The structure for holding a lamp wire in a LCD device of claim 4, wherein the fastening element is a screw.

6. A structure for holding a lamp wire in a LCD device, comprising:

a fixing recess formed at an edge of the LCD device, wherein the fixing recess has an open side surface and open top surface; and a fixing member connected with a fastening element to an upper side of the fixing recess for receiving the lamp wire in the fixing recess so as to cover a portion of the open top surface of the fixing recess and for supporting the lamp wire inserted into the fixing recess wherein the fixing member includes a fastening element alignment means, wherein said fastening element alignment means is two notch protrusions for aligning the fastening element.

7. The structure for holding a lamp wire in a LCD device of claim 6, wherein the fixing member is made from synthetic resin.

8. The structure for holding a lamp wire in a LCD device of claim 6, wherein the fixing member is made from plastic.

9. The structure for holding a lamp wire in a LCD device of claim 6, wherein the fixing member is rigid.

10. The structure for holding a lamp wire in a LCD device of claim 6, wherein the fastening element is a screw.

11. The structure for holding a lamp wire in a LCD device of claim 7, wherein the fastening element is a screw.

12. The structure for holding a lamp wire in a LCD device of claim 8, wherein the fixing member is rigid.

13. The structure for holding a lamp wire in a LCD device of claim 8, wherein the fixing member has a rectangular shape.

14. A structure for holding a lamp wire in a LCD device, comprising:

a LCD module including a backlight assembly including a lamp;

a fixing recess for holding a lamp wire;

a lamp wire for electrically connecting the lamp to an external power source, wherein the fixing recess is formed at one edge of the LCD device, the fixing recess having open external surface and open top surface; and a fixing member connected to an external upper side of the fixing recess by a fastening element, wherein the fixing member covers a portion of the open top surface and prevents the lamp wire from being separated from the lamp wherein the fixing member includes a fastening element alignment means, wherein said fastening element alignment means is two notch protrusions for aligning the fastening element.

* * * * *